Dec. 30, 1930.  E. BÜRGIN ET AL  1,786,516
PROCESS FOR THE CONTINUOUS PRODUCTION OF FUSED CAUSTIC ALKALIS
Filed Feb. 21, 1929
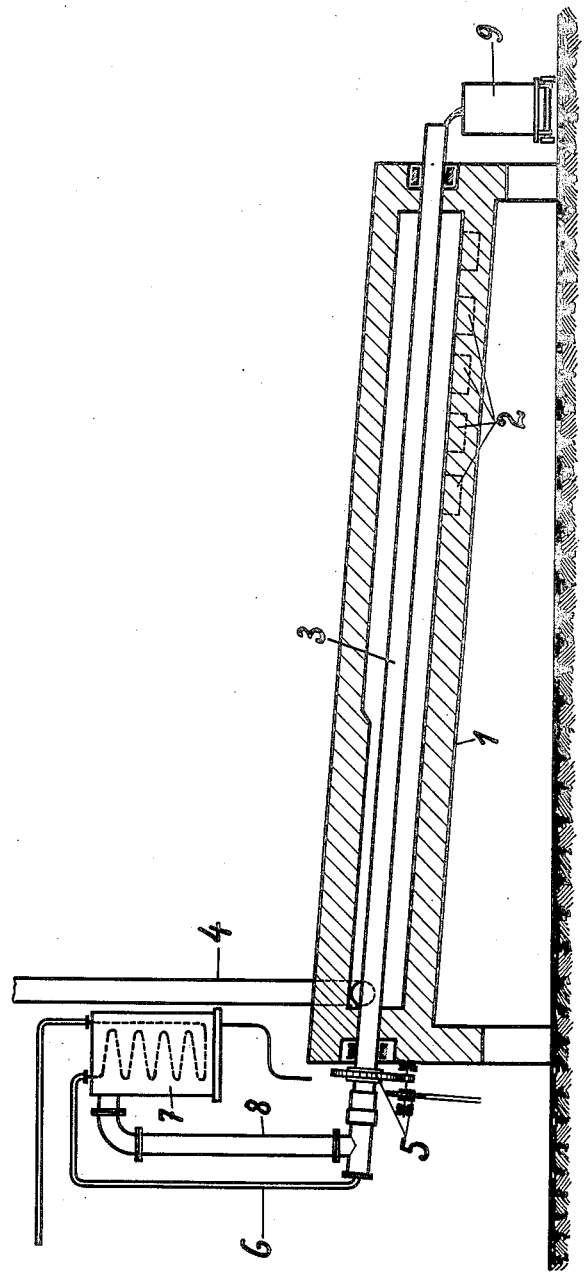

Patented Dec. 30, 1930

1,786,516

UNITED STATES PATENT OFFICE

ERNST BÜRGIN AND WALTER SCHMID, OF RHEINFELDEN, GERMANY, ASSIGNORS TO I. G. FARBENINDUSTRIE AKTIENGESELLSCHAFT, OF FRANKFORT-ON-THE-MAIN, GERMANY, A CORPORATION OF GERMANY

PROCESS FOR THE CONTINUOUS PRODUCTION OF FUSED CAUSTIC ALKALIES

Application filed February 21, 1929, Serial No. 341,823, and in Germany February 29, 1928.

This invention relates to a process for the continuous production of fused caustic alkalies.

As is well known, fused caustic alkalies are at present mainly produced by heating the previously concentrated lyes in large boilers of cast iron of specially chosen composition to such an extent that a melt of the desired concentration of caustic alkali is obtained, which after a certain interval for allowing the melt to clarify is ladled out either into canisters when producing blocks or on dishes when producing slabs, lumps or the like. Under these conditions the boilers are attacked externally by virtue of the high degree of superheat, and internally by the caustic alkalies, as temperatures of red heat are necessary for the removal of undesirable discoloration and impurities.

In order to dehydrate caustic alkalies it has already been proposed to pass the lyes successively through a system of heated iron retorts, and to treat thin layers of lye in each individual retort at a temperature corresponding to the water contents of the lye, the last traces of water being removed at red heat.

The present invention relates to a process which differs from both the intermittent process and the retort process hereinbefore set forth and in which the evaporation is carried out in a heated rotary tube, into one end of which the lye is continually fed, and within which, by virtue of the revolution of the tube and the adhesive properties of the liquid a permanent film of lye or melt on the whole inner surface of the tube is maintained. (By "lye" we understand a mixture of caustic alkali and water forming a liquid at ordinary temperature, by "melt" we mean a mixture solid at ordinary temperature.)

Under these conditions a much more efficient and uniform transference of heat takes place than has hitherto been the case so that it is possible to effect dehydration in a much shorter time, at a considerably lower temperature, and with a markedly lower consumption of fuel. With a given amount of heat it is possible, by regulating the quantity of the inflowing lye of a given concentration (the lyes preferably being fed into the rotating tube at the customary concentration of about 45 to 50% by weight) to cause a caustic alkali melt of the desired concentration, completely or almost completely deprived of water, to issue continuously from the rotating tube and to be conveyed directly to canisters or to dishes. The rotating tube may also, if desired, be brought to the required temperature by suitably disposed electrical heating devices.

In the annexed drawing an apparatus is shown in which the process according to the invention may be carried out. A tubular channel 1 built in brick is provided with orifices 2 allowing the entrance of hot gases which after heating the tube 3 have their exit at 4. The tube 3 fitted at the inside with a silver sheet tube (not shown) is in connection with means 5 for causing the tube to rotate with the desired speed. At the upper end of the tube the lye to be treated enters by a tubulure 6 coming from a preheating device 7, heated by steam issuing from the tube 3 and passing through 8. The melt issuing at the lower end of tube 3 is gathered in a canister 9.

In order to produce a pure white product, the heating tube is advantageously made of or lined with silver which is not attacked by the fused material. It is however also possible to employ other substances which at the fusion temperature of the caustic alkalies remain practically unattacked by the latter. Moreover, baser metals may be employed for this purpose in such cases where the presence of a small content of heavy metal oxides in the caustic alkalies or the color of the product or limited corrosion of the tube is of minor consequence. In any case care must be taken to exclude oxygen, this being effected for instance by maintaining a slight super-pressure of the steam evolved during the evaporation and allowing steam to escape at the end where the melt issues, in a quantity sufficient to prevent the entrance of air.

On account of their high heat content the vapors evolved are preferably utilized thermo-technically by any of the known methods, for example for preheating the inflowing lye or for doing mechanical work after compression.

*Example*

An inclined rotating silver tube upon which the heating gases are caused to impinge directly is employed for removing water from the lyes. At the colder end of the tube a previously concentrated caustic alkali lye electrolytically produced, and containing 480 to 500 grams of NaOH per kg., is caused to flow in while at the hotter end the temperature of the heating gases is kept so high as to cause the melt issuing from the rotating tube to attain a maximum temperature of 300 to 370° C., varying according to the desired degree of dehydration and to the alkali to be treated, caustic potash needing a higher temperature than caustic soda. Super-heating the melt essentially over its melting point is of no advantage.

When a lye preheated to 100° C. and containing 500 grams NaOH per kg. is to be dehydrated in a tube with a heating surface of one square meter, a fused caustic soda entirely free from water may be obtained by fixing the rate of inflow at about 62.5 kilograms per hour. The steam thus evolved is preferably lead to the preheater for the lye.

The yield of an anhydrous product from an input of 62.5 kilograms of 50% caustic soda lye per hour with one square meter of heating surface, hereinbefore given by way of example, is at least equal to about five times the normal yield obtained when dehydrating by means of cast iron boilers. However, this ratio may still be increased, a yield of 62.5 kilograms not being the maximum yield obtainable by our process.

Owing to the fact that by the use of the process as described, the emptying of the boilers by hand or by pumping is dispensed with, the production of fused caustic alkalies is rendered extensively mechanical, this also involving a considerable simplification of the operating side.

We claim:

1. The process for the continuous production of fused caustic alkalies from concentrated caustic alkali lyes which comprises introducing same into a rotating inclined metallic tube which is externally heated, evaporating the lye therein, subjecting the resulting melt to a temperature sufficient to dehydrate the melt to the desired alkali content, and gathering the melt issuing from the tube.

2. The process for the continuous production of fused caustic alkalies from concentrated caustic alkali lyes which comprises introducing same into a rotating inclined metallic tube which is externally heated, evaporating the lye to produce a melt, keeping the inner surface of the tube covered by the melt by running the tube with the required speed, subjecting the melt to a temperature sufficient to dehydrate the melt to the desired alkali content, and gathering the melt issuing from the tube.

3. The process for the continuous production of fused caustic alkalies from concentrated caustic alkali lyes which comprises introducing same into a rotating inclined metallic tube which is externally heated, evaporating the lye to produce a melt, keeping the inner surface of the tube covered by the melt by running the tube with the required speed, subjecting the melt to a maximum temperature of about 300 to 370° C. for dehydrating the melt so as to obtain a substantially anhydrous caustic alkali, and gathering the melt issuing from the tube.

4. The process for the continous production of fused caustic alkalies from concentrated caustic alkali lyes which comprises introducing same into a rotating inclined tube made of iron internally covered by a metal more resistant to caustic alkali than iron, said tube being externally heated, evaporating the lye to produce a melt, keeping the inner surface of the tube covered by the melt by running the tube with the required speed, subjecting the melt to a maximum temperature of about 300 to 370° C. for dehydrating the melt to obtain a substantially anhydrous caustic alkali, and gathering the melt issuing from the tube.

5. The process for the continuous production of fused caustic alkalies from concentrated caustic alkali lyes which comprises introducing same into a rotating inclined tube made of iron containing a tube of silver sheet, the combined tube being externally heated, evaporating the lye to produce a melt, keeping the inner surface of the tube covered by the melt by running the tube with the required speed, subjecting the melt to a maximum temperature of about 300 to 370° C. for dehydrating the melt to obtain a substantially anhydrous caustic alkali, and gathering the melt issuing from the tube.

6. The process for the continuous production of fused caustic soda from concentrated caustic soda lyes which comprises introducing same into a rotating inclined tube made of iron containing a tube of silver sheet, the combined tube being externally heated, evaporating the lye to produce a melt, keeping the inner surface of the tube covered by the melt by running the tube with the required speed, subjecting the melt to a maximum temperature of about 320 to 330° C. for dehydrating the melt to the desired anhydrous caustic soda content, gathering the melt issuing from the tube, and causing the steam produced to escape for the greater part at the end of the tube at which the lye is introduced and to escape at the other end in a quantity sufficient to prevent the entrance of air.

In testimony whereof, we affix our signatures.

ERNST BÜRGIN.
WALTER SCHMID.